United States Patent [19]
Wagner et al.

[11] 3,718,618
[45] Feb. 27, 1973

[54] EPOXY RESIN COMPOSITIONS CONTAINING A PARTIAL ACID-ADDITION SALT OF AROMATIC POLYAMINE AND WATER SOLUABLE AMINE

[75] Inventors: Herman B. Wagner, Perkasie, Pa.; David S. Weiant, Laurel Township, Moorestown County, N.J.

[73] Assignee: Tile Council of America Inc., New York, N.Y.

[22] Filed: April 6, 1970

[21] Appl. No.: 26,112

[52] U.S. Cl. ............... 260/47 EN, 106/39 R, 106/89, 117/161 ZB, 117/169 R, 260/2 N, 260/29.1 R, 260/30.2, 260/37 EP, 260/59, 260/830 R, 260/835
[51] Int. Cl. ............................................. C08g 30/14
[58] Field of Search....260/47 EP, 2 EP, 59, 29.2 EP, 260/18 EP

[56] References Cited

UNITED STATES PATENTS

| | | | |
|---|---|---|---|
| 3,277,052 | 10/1966 | Thompson et al. | 260/47 |
| 2,965,517 | 12/1960 | Albrecht et al. | 260/29.2 EP |
| 2,681,901 | 6/1954 | Wiles et al. | 260/47 EP |
| 3,018,258 | 1/1962 | Meier et al. | 260/47 EP |
| 3,347,802 | 10/1967 | Ashby et al. | 260/29.2 EP |
| 3,305,501 | 2/1967 | Spalding | 260/29.2 EP |

Primary Examiner—William H. Short
Assistant Examiner—T. Pertilla
Attorney—Morgan, Finnegan, Durham & Pine

[57] ABSTRACT

Water-cleanable epoxy resin compositions capable of curing rapidly at ambient temperatures which contain an epoxy resin, a partial acid-addition salt of an aromatic polyamine and a water-soluble, strongly basic amine are described.

15 Claims, No Drawings

EPOXY RESIN COMPOSITIONS CONTAINING A PARTIAL ACID-ADDITION SALT OF AROMATIC POLYAMINE AND WATER SOLUABLE AMINE

BACKGROUND OF THE INVENTION

This invention relates to epoxy resins which are hardened by aromatic amines. More particularly, it relates to aromatic amine hardening epoxy resins which may be cured at practical rates under ambient temperature conditions.

It relates further to novel epoxy resin compositions which may be easily water cleaned from areas in which they have been installed or applied.

Prior to this invention, the epoxy-aromatic amine systems which were known, reacted at a much lower rate in the hardening process as compared with that of epoxy-aliphatic amine systems so that utilization under these conditions was precluded. Since many situations exist where a room temperature cure is essential and since epoxy resins harden by reaction with aromatic amines are known to have superior chemical resistance, the attractiveness of compositions as disclosed and claimed herein becomes apparent. In addition, no epoxy compositions hardened by aromatic amines were known prior to this time which were capable of being water cleaned resulting in the easy removal of the fluid mixtures of epoxy resin and hardener from areas and tools immediately after the epoxy resin composition had been installed or applied. The subject compositions permit the use of water rather than noxious or inflammable organic solvents to facilitate this cleaning operation.

The compositions of the present invention, therefore, provide rapid room temperature hardening and the ability to be water cleaned while simultaneously retaining the inherent chemical resistance of epoxy resins cured by aromatic amines.

SUMMARY OF THE INVENTION

Accordingly, this invention discloses and claims a water-cleanable epoxy resin composition which can be cured rapidly at ambient temperatures which comprises an epoxy resin, a partial acid-addition salt of an aromatic polyamine and a water-soluble, strongly basic amine.

Of particular importance are those compositions in which the epoxy resin is a bisphenol A-epichlorohydrin, novolak or polyglycol-type resin. Particularly preferred aromatic polyamines which are used in the herein disclosed compositions are benzidine, 4,4'-methylenedianiline, 4,4'-ethylenedianiline, 4,4'-methylenedi-(naphthyl-amine), m- and p-aminoaniline and m- and p-phenylenediamine. The aromatic polyamine is in the form of a partial acid-addition salt wherein said acid is inorganic or organic and is present in an amount sufficient to neutralize from 30 per cent to about 80 per cent of the amino nitrogens. Still another preferred embodiment of the present invention is the use of highly basic, water-soluble amines such as triethylamine and triethanolamine which possess ionization constants greater than said aromatic polyamine.

It has also been found that the cleaning step is facilitated by the use of surface active agents. Particularly effective are sodium alkyl sulfonate surfactants.

The compositions of this invention find utility in many applications such as setting and grouting of ceramic tiles, providing monolithic floor surfacing over concrete and other substrates, as coatings for floor surfaces, as tank linings and as adhesives, particularly where superior chemical resistance and ease of installation and cleaning are required.

DETAILED DESCRIPTION OF THE INVENTION

The fundamental components which make up the presently disclosed compositions having the ability to cure rapidly at room temperature are: (1) an epoxy resin; (2) a partial acid-addition salt of an aromatic polyamine; and (3) a water-soluble, strongly basic amine.

On a per cent by weight basis, the following amounts of each component is preferred:

| | |
|---|---|
| epoxy resin | 5 to 20% by weight |
| acid-addition salt of polyamine | 2 to 8% by weight |
| basic amine | 0.5 to 2% by weight |

The above percentages are based on the total weight of the composition. It will be obvious that in order to total 100 percent, materials such as fillers, resins, pigments, coloring materials and adhesives, etc., will necessarily comprise the balance.

It is also beneficial to include a surfactant to the above composition. Particularly preferred is a sodium alkyl sulfonate; however, many others will be equally applicable such as sodium alkylnaphthalene sulfonates, sodium alkylaryl sulfonates and chlorosulfonated paraffinic hydrocarbons. Although the surfactant can comprise from about 1 to about 5 percent by weight of the total composition, most preferred is a 2 to 3 percent by weight concentration.

Most preferred is a composition having about 10 percent by weight of epoxy resin, about 5 percent by weight of acid-addition salt of aromatic polyamine, about 1 percent by weight of water-soluble, basic amine and about 2.5 percent by weight of surfactant.

With regard to the epoxy resin component, it is found that certain types are most preferred for utilization in the compositions of this invention. They include bisphenol A-epichlorohydrin resins which are prepared by reaction of epichlorohydrin with bisphenol-A in the presence of catalyst. They have the structural formula:

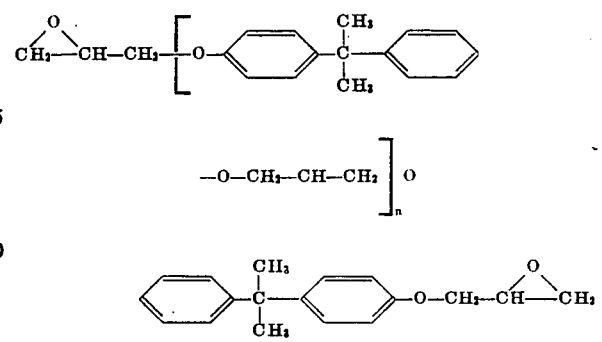

where $n$ has a value averaging from 0 to 18.

Another highly desirable resin is the novolak type resin having the structural formula:

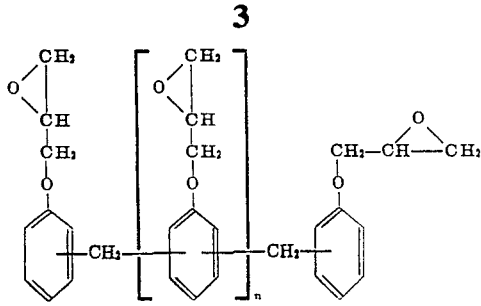

where $n$ has a value averaging from 0.2 to 1.5.

Still another highly desirable resin for purposes of this invention is the polyglycol type having the formula:

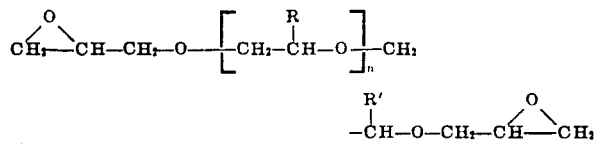

where $n$ has a value averaging from 3 to 6; R and R' are each hydrogen, methyl or ethyl.

Although the $n$ values may vary as indicated above for each resin, it is most advantageous to have the epoxy resin of such molecular weight that it is in liquid form at ambient temperatures. It has also been discovered that the most advantageous epoxy resins, insofar as the hardening step is concerned, are those in which the epoxy group carbons are acyclic rather than cyclic.

Epoxy resins can be cured by a variety of cross-linking agents known as hardeners. When nearly all the reactive sites in the resin have been reacted, the system becomes a tough, infusible material and is considered cured. The cross-linking agents (hardeners) are mixed into, and react with, the epoxy resin. These hardeners contain reactive groups which react with the epoxy groups and become integral parts of the molecular structure.

The hardeners or cross-linking agents which provide the highly advantageous compositions of this invention comprise two types: a partial acid-addition salt of an aromatic polyamine and a strongly basic amine. The aromatic polyamine is defined for purposes of this invention to be any di- or poly-functional primary or secondary amine or mixtures thereof wherein the amine nitrogens are bonded directly to the aromatic nucleus. Illustrative examples include benzidine, 4,4'-methylenedianiline, 4,4'-ethylenedianiline, 4,4'-methylenedi(naphthyl-amine), m- and p-aminoaniline and m- and p-phenylenediamine.

The aromatic polyamine is used herein in the form of a partial acid-addition salt. The salt is prepared by reacting the aromatic amine with an acid, inorganic or organic, whereby the amount of acid added is such that from about 30 percent to about 80 percent of the amino nitrogens are neutralized stoichiometrically.

Most preferred is the partial salt wherein about 50 percent of the amino nitrogens are neutralized.

The acids used to prepare the subject salts may be inorganic such as hydrochloric, hydrobromic, hydroiodic, nitric, phosphoric, sulfuric, sulfamic, sulfurous, etc. or organic such as acetic, chloroacetic, p-toluene sulfonic, lactic, citric, tartaric, oxalic, succinic, maleic, gluconic, etc.

The second type of hardener used in preparing the herein disclosed compositions is defined as a strongly basic amine. By the term "strongly basic amine" is contemplated any amine which is water-soluble and has an ionization constant greater than the aromatic polyamine used in making the aforesaid partial acid-addition salt. Illustrative of such "strongly basic amines" are primary, secondary and tertiary alkylamines wherein said alkyl group contains from one to 12 carbon atoms, alkylene diamines wherein said alkylene group contains from two to six carbon atoms and mon-, di- and tri-hydroxyamines such as ethanolamine, diethanolamine and triethanolamine.

If desired, the epoxy resins can be compounded with other resins, such as polystyrene resins, polyester resins, and so forth, to increase the flexibility of the hardened composition.

Pigments and fillers of various types may also be incorporated into the adhesive compositions. As examples of such fillers may be mentioned blanc fixe, sand, talc, pyrophyllite, various clays, diatomaceous earth, and other like materials. The fillers are preferably in a fine state of subdivision, and have high surface areas.

Coloring materials may be added to the adhesive composition if desired. The coloring materials include organic and inorganic coloring materials. As examples may be mentioned titanium dioxide, carbon black, cadmium red, Blue Lake (13 percent Ponsal Blue, 10 percent aluminum hydrate and 77 per cent blanc fixe)-Krebs BP-179-D, Blue Lake Krebs BP-258-D, Lithol Tower, Chrome Yellow, Iron Blue, Milori Blue, Monastral Green, Maron Toner, chrome green, chrome orange, iron oxide reds, aluminum powder, and flating agents like diatomaceous silica and silica aerogel. The coloring materials should be selected, however, so as to be non-reactive with the epoxy resins and other ingredients at atmospheric temperature, as otherwise this might cause poor storage stability and also affect the retention of adhesiveness.

The adhesive compositions of the present invention may also have incorporated therein, if desired, a lubricant, such as silicone oils, silicone jelly, petroleum jellies, and so forth. As an example of the silicone oil may be mentioned organo-siloxane liquid supplied by General Electric Company as Silicone Liquid No. 81069. Any of the commercially available silicone jellies which are sold under a wide variety of trademarks and trade names may be used.

EXAMPLE I 4,4'-methylenedianiline (5.0 g.) is added to a solution containing 2.5 g. of concentrated HCl (37 percent) in 100 g. of water. The resulting suspension is then heated to about 90°C. with agitation. The reaction is almost instantaneous as evidenced by the formation of a solution. The solution corresponds to a 50% neutralized amine product. Upon partial evaporation of solvent and cooling, the precipitated partial acid-addition salt of amine is filtered and dried.

The above amine salt (10.0 g.) is then mixed with 7.5 g. of triethanolamine and 34 g. of a liquid epichlorohydrin-2,2-bis (p-hydroxyphenyl) propane type epoxy resin having an epoxide equivalent weight of about 180. A portion of this composition is set aside for hardening under ambient conditions. Hardening occurred within 24 hours after mixing. A second portion is spread over the face of a vitreous ceramic tile, of the type frequently used where a flooring exhibiting substantial chemical resistance is required. No difficulty was found in cleaning the liquid composition from the tile face with a water-wetted sponge.

EXAMPLE II

The procedure of Example I is repeated wherein benzidene in stoichiometric equivalent amounts, is used in lieu of 4,4'-methylenedianiline with good results.

EXAMPLE III

The procedure of Example I is repeated wherein m-phenylenediamine, in stoichiometric equivalent amounts, is used in lieu of 4,4'-methylenedianiline with good results.

EXAMPLE IV

The procedure of Example I is repeated wherein p-phenylenediamine, in stoichiometric equivalent amounts, is used in lieu of 4,4'-methylenedianiline with good results.

EXAMPLE V

The procedure of Example I is repeated wherein the following aromatic polyamines, in stoichiometric equivalent amounts, are used in place of 4,4'-methylenediamine with good results: 4,4'-ethylenedianiline 4,4'-methylenedi($\alpha$-naphthylamine)
4,4'-methylenedi($\beta$-naphthylamine)
m-aminoaniline
p-aminoaniline

EXAMPLE VI

The procedure of Example I is repeated wherein triethylamine, in stoichiometric equivalent amounts, is used in place of triethanolamine with correspondingly good results.

EXAMPLE VII

The procedure of Example I is repeated wherein the following water-soluble, strongly basic amines, in stoichiometric equivalent amounts, are used in lieu of triethanolamine with correspondingly good results:

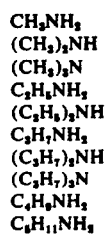
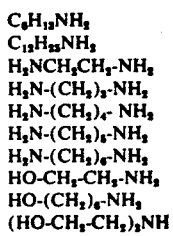

$CH_3NH_2$
$(CH_3)_2NH$
$(CH_3)_3N$
$C_2H_5NH_2$
$(C_2H_5)_2NH$
$C_3H_7NH_2$
$(C_3H_7)_2NH$
$(C_3H_7)_3N$
$C_4H_9NH_2$
$C_6H_{11}NH_2$ $C_8H_{17}NH_2$
$C_{12}H_{25}NH_2$
$H_2NCH_2CH_2\text{-}NH_2$
$H_2N\text{-}(CH_2)_3\text{-}NH_2$
$H_2N\text{-}(CH_2)_4\text{-}NH_2$
$H_2N\text{-}(CH_2)_5\text{-}NH_2$
$H_2N\text{-}(CH_2)_6\text{-}NH_2$
$HO\text{-}CH_2\text{-}CH_2\text{-}NH_2$
$HO\text{-}(CH_2)_6\text{-}NH_2$
$(HO\text{-}CH_2\text{-}CH_2)_2NH$

EXAMPLE VIII

The procedure of Example I is repeated wherein a typical novolak resin, in equivalent amounts, is used in place of the bisphenol A epichlorohydrin resin to provide the corresponding product in good yields.

Similarly, a typical polyglycol type resin, in equivalent amounts, is used in lieu of the bisphenol A epichlorohydrin resin to provide the corresponding product in good yields.

EXAMPLE IX

The procedure of Example I is repeated wherein the following acids, in stoichiometric equivalent amounts, are used in place of HCl with correspondingly good results:

phosphoric acid
sulfuric acid
sulfamic acid acetic acid
chloroacetic acid
p-toluenesulfonic acid

EXAMPLE X

The procedure of Example I is repeated wherein 4 g. of surfactant, Alkanol 189–S* (*Alkanol 189–S is a trademark of du Pont) a sodium alkyl sulfonate having a molecular weight of about 345 is added. The cleaning step is further facilitated by its inclusion in the composition.

EXAMPLE XI

Other ingredients may be advantageously incorporated into the herein disclosed compositions. The following composition is a typical composition which contains many of these ingredients:

| Component | Parts by Weight |
|---|---|
| Epoxy resin - EPON 828[1] | 31 |
| Phenyl glycidyl ether (Fluidity improver) | 3 |
| Petroleum jelly (lubricant) | 1.5 |
| Carbon black (coloring agent) | 0.1 |
| Alkanol 189-S (surfactant) | 4.0 |
| Polystyrene resin (extender) | 10.0 |
| 50% neutralized 4,4'-dimethylenedianiline | 10.0 |
| Sand (filler) | 130.0 |
| Triethanolamine-silica aerogel (1:4) | 10.0 |

[1] An epichlorohydrin-bisphenol type epoxy resin sold under the trademark "Epon Resin 828" by Shell Chemical Corporation.

What is claimed is:

1. A water-cleanable epoxy resin composition which cures rapidly at ambient temperatures comprising an epoxy resin selected from the group consisting of bisphenol A epichlorohydrin resins, polyglycidyl ethers of novalak resins and diglycidylethers of polyglycol resins, a partial acid-addition salt of an aromatic polyamine derived from an acid present in an amount sufficient to neutralize from about 30 percent to about 80 percent of the amine nitrogens, said salt comprising from about 2 percent to about 8 percent by weight of the total composition, and a water-soluble, strongly basic amine having an ionization constant greater than said aromatic polyamine selected from the group consisting of alkylamines, alkylenediamines and mono-, di- and trihydroxyalkylamines, said strongly basic amine comprising from about 0.5 to about 2.0 percent by weight of the total composition.

2. The composition of claim 1 wherein a surface active agent is included.

3. The composition of claim 2 wherein said surface active agent is a sodium alkyl sulfonate.

4. The composition of claim 1 wherein said epoxy resin comprises from about 5 percent to about 20 percent by weight of the total composition.

5. The composition of claim 1 wherein said aromatic polyamine is selected from the group consisting of polyfunctional primary and secondary amines and mixtures thereof wherein the amine nitrogens are bonded directly to the aromatic nucleus.

6. The composition of claim 5 wherein said aromatic polyamine is selected from the group consisting of benzidine, 4,4'-methylenedianiline, 4,4'-ethylenedianiline, 4,4'-methylenedi-(naphthyl-amine), m- and p-aminoaniline and m- and p-phenylenediamine.

7. The composition of claim 6 wherein said polyamine is benzidine.

8. The composition of claim 6 wherein said polyamine is 4,4'-methylenedianiline.

9. The composition of claim 6 wherein said polyamine is m-phenylenediamine.

10. The composition of claim 6 wherein said polyamine is p-phenylenediamine.

11. The composition of claim 1 wherein said acid is an inorganic acid selected from the group consisting of phosphoric acid, sulfuric acid, sulfamic acid and hydrochloric acid.

12. The composition of claim 11 wherein said acid is hydrochloric acid.

13. The composition of claim 1 wherein said acid is an organic acid selected from the group consisting of acetic acid, chloroacetic acid and p-toluene sulfonic acid.

14. The composition of claim 1 wherein said strongly basic amine is triethylamine.

15. The composition of claim 1 wherein said strongly basic amine is triethanolamine.

* * * * *